United States Patent
Weaver

(10) Patent No.: US 9,914,131 B2
(45) Date of Patent: *Mar. 13, 2018

(54) WOOD-BASED CEMENT ADDITIVE

(71) Applicant: Fiber Resources, Inc., Pine Bluff, AR (US)

(72) Inventor: William R. Weaver, Pine Bluff, AR (US)

(73) Assignee: Fiber Resources, Inc., Pine Bluff, AR (US)

( * ) Notice: Subject to any disclaimer, the term of this patent is extended or adjusted under 35 U.S.C. 154(b) by 185 days.

This patent is subject to a terminal disclaimer.

(21) Appl. No.: 15/019,477

(22) Filed: Feb. 9, 2016

(65) Prior Publication Data

US 2016/0159688 A1    Jun. 9, 2016

Related U.S. Application Data

(63) Continuation-in-part of application No. 13/494,743, filed on Jun. 12, 2012, now Pat. No. 9,290,687.

(51) Int. Cl.
| | |
|---|---|
| *C09K 8/035* | (2006.01) |
| *C09K 8/02* | (2006.01) |
| *B02C 23/08* | (2006.01) |
| *C09K 8/473* | (2006.01) |
| *C09K 8/467* | (2006.01) |
| *C04B 28/02* | (2006.01) |
| *C04B 18/26* | (2006.01) |
| *C04B 111/40* | (2006.01) |

(52) U.S. Cl.
CPC .............. *B02C 23/08* (2013.01); *C04B 18/26* (2013.01); *C04B 28/02* (2013.01); *C09K 8/467* (2013.01); *C09K 8/473* (2013.01); *C04B 2111/40* (2013.01); *C09K 2208/08* (2013.01); *Y02W 30/97* (2015.05)

(58) Field of Classification Search
CPC .................................................. C09K 2208/08
USPC ........................................................ 507/104
See application file for complete search history.

(56) References Cited

U.S. PATENT DOCUMENTS

| | | | | |
|---|---|---|---|---|
| 2,749,308 A  * | 6/1956 | Beckum | ................ | E21B 21/003 |
| | | | | 507/104 |
| 4,211,740 A  * | 7/1980 | Dean | ..................... | B30B 11/201 |
| | | | | 264/115 |
| 4,324,561 A  * | 4/1982 | Dean | ..................... | B30B 11/201 |
| | | | | 44/589 |
| 2007/0186822 A1* | 8/2007 | Utagaki | .................. | C04B 28/04 |
| | | | | 106/805 |
| 2009/0064569 A1* | 3/2009 | Khater | .................. | B30B 11/228 |
| | | | | 44/589 |

\* cited by examiner

*Primary Examiner* — Aiqun Li

(57) ABSTRACT

A wood-based cement additive is formed by mixing high-density pellet particles of various sizes. The additive is to be introduced into a cement source to create a slurry mixture. The density of the mixture of pellet particles is selected to be less than the density of the particular cement type in which the pellet particles are introduced. The pellet particles are formed from sawdust or fiber pressed under high pressure, resulting in brittle pellets. The pellets may then be crumbled and screened into particles of an appropriate size. The particles do not disassociate into their constituent materials when mixed with the cement, and thus maintain their density during use in the cementing process.

19 Claims, 1 Drawing Sheet

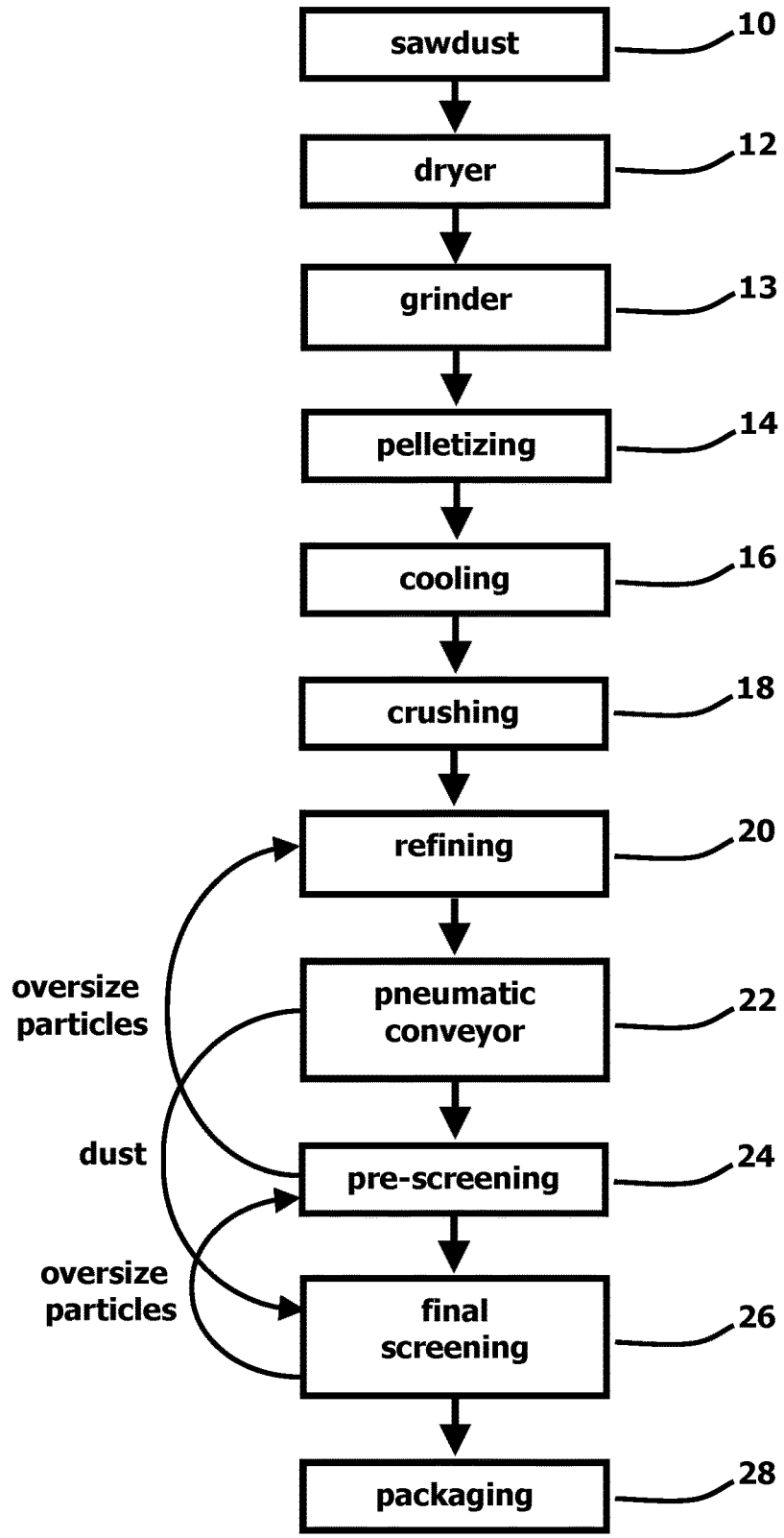

WOOD-BASED CEMENT ADDITIVE

CROSS-REFERENCE TO RELATED APPLICATIONS

This application is a continuation-in-part of, and claims the benefit to, U.S. patent application Ser. No. 13/494,743, entitled "Wood-Based Loss Circulation Material" filed on Jun. 12, 2012. The complete disclosure of such patent application is hereby incorporated by reference.

STATEMENT REGARDING FEDERALLY SPONSORED RESEARCH OR DEVELOPMENT

Not applicable.

BACKGROUND OF THE INVENTION

The present invention relates to cement additives, and more particularly to wood-based cement additives designed to lighten the weight of the cement without degrading the cement.

Cement has a great many uses in construction and industry. One particular application is use of cement in the drilling industry, such as oil and gas drilling. As part of the drilling process, cementing is typically used to protect and seal the wellbore. Most commonly, cement is used to prevent water penetration into the well. Cementing can also be used to seal a lost circulation zone (an area where there is a reduction of flow within the well) or to plug an abandoned well. The process of cementing involves mixing cement, cement additives, and water to form a slurry, before pumping that mixture through the casing to the critical points.

Various types of cement additives exist, including additives aimed at reducing the weight or density of the cement. Examples of weight-reducing additives include microsilica, diatomaceous earth, glass spheres, and foam cement. These additives have a lower specific gravity than that of cement, which typically has a specific gravity of around 3.15 for portland cement, and thus give the cement slurry a lower density (except in the case of microsilica). Reducing the density of cement slurries leads to reduced hydrostatic pressure of the fluid column during cement placement and increased slurry yield, which reduces the amount of cement required to produce a given volume. Existing weight-reducing cement additives, however, do not come without limitations. Microspheres, or hollow glass spheres, for example, are susceptible to crushing during mixing and pumping, which may lead to increased slurry density and viscosity, decreased slurry volume, or premature slurry dehydration. Microsilica, or silica fume, is useful to improve the compressive strength, bond strength, and abrasion resistance of cement; however, it is expensive and is limited by a lack of sufficient supply for all possible applications.

The present invention overcomes the limitations associated with existing cement additives, and presents certain advantages over the existing technology as set forth below.

BRIEF SUMMARY OF THE INVENTION

The present invention is directed to a wood-based cement additive for introduction into cement for the purpose of creating a cement slurry of reduced weight. One application, although not limiting to the invention, is in the drilling industry. The cement additive is formed by employing very high pressures during the pelletizing process, wherein refined sawdust is reduced to high-density pellets. The resulting pellets are very brittle, and thus may be easily crumbed and screened into appropriate size groups for various cement additive applications. Hardwood is the preferred wood fiber source because it does not appreciably absorb water from the cement, which would have a dramatic effect on the viscosity of the cement slurry, but the invention is not so limited and may include other fiber sources. The crumbles introduced into the cement do not appreciably break down into their constituent components while in the cement slurry, and thus no unintended increase in viscosity or density occurs as it does in applications using glass sphere additives when glass spheres are crushed during mixing. The additive in certain embodiments maintains a fiber length long enough to allow the cement to form a strong bond with the additive, and thus the particles preferably are of a certain minimum size.

In one aspect of the present invention, the invention is directed to wood-based cement additive for mixing with a cement source to form a slurry of reduced weight, the additive consisting essentially of wood fiber and water, wherein the material has a density lower than the density of the cement source.

In another aspect of the present invention, the invention is directed to a method for manufacturing a wood-based cement additive for mixing with a cement source to form a reduced weight slurry, wherein the additive consists essentially of wood fiber and water, the method comprising the steps of drying a sawdust material to a desired moisture content, pelletizing the sawdust material to produce pellets, wherein the density of the pellets is less than the density of the cement source, crumbling the pellets into smaller particles, screening the particles for size, and mixing various sizes of particles while maintaining sufficient particle size to form a strong bond with the cement.

It is therefore an object of the present invention to provide for a wood-based cement additive with a density less than the density of the cement source to which it is added.

It is also an object of the present invention to provide for a crumbled cement additive that easily mixes with a desired cement source without significantly disassociating into its constituent particles.

It is a further object of the present invention to provide for a cement additive that is inexpensive to produce and transport.

It is a further object of the present invention to provide for a cement additive that is compact when stored.

It is a further object of the present invention to provide for a cement additive that is environmentally safe.

It is a further object of the present invention to provide for a cement additive that decreases the density of a cement sourced when mixed with the cement source to create a cement slurry.

These and other features, objects and advantages of the present invention will become better understood from a consideration of the following detailed description of the preferred embodiments and appended claims in conjunction with the drawing as described following:

BRIEF DESCRIPTION OF THE SEVERAL VIEWS OF THE DRAWINGS

FIG. 1 is a flow chart illustrating the process for forming a wood-based cement additive according to a preferred embodiment of the present invention.

DETAILED DESCRIPTION OF THE PREFERRED EMBODIMENT(S)

With reference to FIG. 1, a method of manufacturing a wood-based cement additive according to a preferred embodiment of the present invention may be described.

The base material used in the manufacturing of the cement additive according to a preferred embodiment of the present invention is hardwood sawdust or fiber. The material is acquired at step 10 of FIG. 1. This material is widely available at relatively low cost from lumber mills and like locations, typically in the form of wood chips that are produced in the manufacture of lumber from hardwood logs. Hardwood is preferred because it does not significantly absorb the water in the cement, which would cause a dramatic change in the viscosity of the cement slurry. Oak is the most preferred hardwood material due to its acidity. While 100% hardwood sawdust or fiber is used in the preferred embodiment of the present invention, however, softwood sawdust or fiber, a blend of hardwood and softwood sawdust or fiber, or other wood-based materials may be used in alternative embodiments of the present invention. Examples include cedar fiber, and torrefied wood (which yields a hydrophobic product).

The hardwood sawdust or fiber is dried at step 12 of FIG. 1. Equipment for drying sawdust, fiber, and other wood-based materials is well known in the art. In the preferred embodiment, the sawdust or fiber is dried to the point where it is comprised of 10% to 14% moisture by weight, while it is believed to be ideal to dry the sawdust to about 11% moisture by weight. In alternative embodiments, more or less moisture may be retained in the dried sawdust. Retaining less moisture in the pellet will result in a denser pellet, so drying step 12 is an important factor in the density of the final product.

The dried sawdust or fiber is ground to a uniform particle size at step 13. The preferred particle size is less than 5 mesh, but larger or smaller particles may be employed in alternative embodiments of the present invention, or this step of creating a uniform particle size may be skipped altogether. A hammer mill is used in the preferred embodiment to reduce the wood particles to a uniform size, although other means may be used in alternative embodiments. The reduction of the wood particles to a uniform size is an aid to pelletization, as described below.

At step 14, the dried material is pelletized. Pellet mills and other machinery that may be used to form pellets from sawdust, wood fiber, and like materials are well known in the art. By controlling the amount of pressure applied during the pelletization process, the density of the resulting pelletized material may be controlled. In the preferred embodiment, the density of the resulting pelletized material is very high, in the range of about 75 pounds per cubic foot to about 85 pounds per cubic foot. (It may be noted that this is the actual pellet density, not the bulk density of the product when packaged, which will be lower.) A very high pressure of about 50,000 pounds per square inch is used in a pellet mill according to the preferred embodiment of the present invention in order to achieve this density. This density is intended to be less than that of cement, in order to effectively reduce the density of the cement slurry. In alternative embodiments, different pressures may be used in the pelletization process in order to produce pellets of different density for different cement slurry applications. The pressures used in this process are so high that the individual fiber cells in the pellets are crushed, such that the pellets are quite brittle and easily reduced in size (crumbled) without lowering the actual particle density.

The pellets according to a preferred embodiment are approximately ¼" in diameter. Other sizes, however, are within the scope of the invention. By lowering the diameter of the pellet, the surface area of the pellet (and, therefore, of the final crumbled material) will be increased. Surface area and geometry are believed by the inventor to play an important role in the functional parameters of the finished material, although the invention is not intended to be limited by this theory.

The pelletization process results in a great deal of heat within the material being pelletized, particularly at the very high pressures employed with respect to the preferred embodiment of the present invention. This heat aids in the process of forming an integral pellet without the need to use additional binding agents. No binding agent other than the moisture already present in the material is necessary in the preferred embodiment. In addition, the heat and pressure cause the surface of the pellets to be thermomechanically changed through fluidization of the lignins in the wood. This heat and pressure also serves to sanitize the resulting wood pellets.

In the preferred embodiment, pellets resulting from the pelletization process of step 14 will have a temperature of about 300° Fahrenheit. The pellets must be cooled for further processing, and this cooling takes place at step 16 of FIG. 1. In the preferred embodiment, the pellets are cooled to ambient temperature at step 16. Cooling results in the loss of additional moisture within the pellets, so that in the preferred embodiment the pellets have a moisture content of only about 8% by weight after the cooling process of step 16. The cooled pellets may be stored for later use, or immediately conveyed for further processing. Optionally, the cooled pellets may be screened to remove any non-pellet material, such material then being returned to the feed stock of the pellet mill at step 14.

At step 18 of FIG. 1 the cooled pellets are crushed or crumbled into smaller particles. In the preferred embodiment of the present invention this step may be performed using a roller mill or pellet crumbler, both of which are well known in the art. Examples include single or double pairs of rollers in stacked crumble roller mills. The crushing or crumbling of the pellets may be performed in any number of other ways in alternative embodiments of the present invention.

The crumbled pellets are then metered into a disk refiner or attrition mill at refining step 20. Disk refiners and attrition mills are well known in the art. In the preferred embodiment, an Andritz Sprout-Bauer attrition mill model DM-24 is used to perform this step, driven by a 50 horsepower motor and using a set of "G" patterned refining plates. Other equipment may be substituted in alternative embodiments of the present invention. The purpose of this step is to cut the particles in order to provide further reduction in particle size, without fluffing or fraying of the individual wood fibers in the particles. Fluffing or fraying would serve to lower the overall density of the resulting particles below the desired level and should therefore be avoided.

At step 22, the refined particles are delivered to a pneumatic conveyor system. Pneumatic conveyors use pipes or ducts that carry a mixture of materials with a stream of air. Small, relatively dry particles such as those that are delivered from the refiner at step 20 according to the preferred embodiment of the present invention may be easily moved by means of pneumatic conveying systems. Numerous pneumatic conveying systems, including both vacuum systems and positive pressure systems, are known in the art. In the preferred embodiment of the present invention, the pneumatic conveyor serves not only to move the particles to the next step in manufacturing, but also provides additional cooling of the particles, which is desirable for further processing. In the preferred embodiment, the particles are cooled from a temperature of about 200 to 300° Fahrenheit leaving the refiner to about ambient temperature at the end of the pneumatic conveyor. This results in further moisture loss in the material, such that the resulting material has a moisture by weight content of less than 8%, preferably in the range of 4% to 8% moisture by weight. In addition, the use of a pneumatic conveyor provides a means of removing the ultra-fine dust and particulate that has been generated by processing up to this point. Removal of the ultra-fine dust and particulate also reduces the risk of fire or explosion that could result if the particulate-air stream were to be exposed to a spark or flame.

At step 24 of FIG. 1, the particles emerging from the pneumatic conveyor are pre-screened to ensure that they are no larger than a set size. In the preferred embodiment, a screen size of 7 mesh is used, although other sizes could be used in alternative embodiments. Those particles that are too large to fit through the screen are returned to the refiner at refining step 20 for further size reduction. These crumbled pellet particles, which cannot pass through the 7 mesh screen, are those that are larger than about 0.111 inches in diameter.

Those particles that pass through the pre-screening process at step 24 are passed to the final screening at step 26. In the preferred embodiment, three different screen sizes are employed in order to produce crumbled particles that fall into three different grades: coarse, medium, and fine, where, in the preferred embodiment, the coarse and medium may be mixed to form the final product. Coarse particles are those that do not pass through a screen of 18 mesh size. This corresponds to particles larger than about 0.0394 inches in diameter. These coarse particles may then be conveyed away for separate storage. The particles that pass through the 18 mesh size screen are then introduced to a screen at 60 mesh size, and those that do not pass through are deemed the "medium" particles. They may also be conveyed away for separate storage. These particles are those that are larger than about 0.0098 inches in diameter. Those that pass through the 60 mesh size screen are passed to a screen of 200 mesh size. Those that do not pass through are deemed the "fine" particles. These particles are those larger than about 0.0029 in diameter. In the preferred embodiment, these fine particles are stored in a separate location for use in other applications, as they may be too small for use in cementing applications. The very fine particular material or dust that passes through the 200 mesh screen may be sent to a bag house. It may be noted that in the case where there is an excess of coarse particles, these may be returned to refining step 20 in order to reduce their size, whereby a larger quantity of the medium and fine particles will be passed upon the process being repeated.

In step 28, the coarse and medium particles resulting from this process may be packaged for shipment, in a manner as known in the art. The discrete particle sizes may be collected in bins then bagged discretely. Alternatively, the coarse and medium sizes may be mixed in specified proportions in order to produce a custom blended product for various unique applications. The fine particles resulting from the process may be sold as is or may be used for other drilling applications, as the fibers in the fine particles are not of sufficient length to form a strong bond with the cement. Alternatively, they may be returned as raw material for palletization at step 14.

The finished product resulting from this process will be a collection of crumbled pellets in graded sizes. In the case of a 100% oak product, the approximate bulk density of the crumbles will be about 22 to 27 pounds per cubic foot for the fine particles, about 29 to 32 pounds per cubic foot for the medium particles, and about 30 to 34 pounds per cubic foot for the coarse particles. Again referring to the case where the crumbles are 100% oak, the crumbles will be dark to light tan in color, the color being lighter for the smaller particles. The specific gravity will also vary somewhat with particle size, with the finer particles being lower in specific gravity. In the preferred embodiment, the coarse/medium particles vary within a specific gravity range of about 1.1 to 1.3. This is seen as an ideal range for various cementing applications, such that custom mixing of the sizes may result in a formulation with a specific gravity less than that of the cement to which it is being added and that corresponds to the desired properties of the cement slurry. It may be noted that due to the cutting/shearing action by which the particles are manufactured, their appearance will be well defined, and not frayed. It is believed by the inventor that this aspect of the crumbled pellets is a factor in the action of the crumbles to substantially remain integral when presented into the cement slurry, rather than disassociating into their constituent fibers, although the invention is not intended to be limited by this theory.

The steps in using the finished product resulting from the manufacturing process of FIG. 1 according to a preferred embodiment of the present invention may now be described. The user may choose to use the coarse, medium, or a mixture of the coarse and medium particle material depending upon the present application. It is believed that the fine particles are not suited for use in cementing applications as particles smaller than 0.0098 inches will not have the mass to provide quality structure with the cement bond. Various cement applications may be addressed with the various embodiments of the present invention. These include, without limitation, injection into an oil well casing as an additive to seal any geologic fractures or cracks in the well. In addition, applications include the plugging of a hole in the well siding to prevent the loss of cement, which would occur if the hole were left unplugged with cement leaking into the surrounding geologic structure.

Different quantities of the particles may be used in the cement for various applications as described above. In general, a range of about 5 pounds to 40 pounds of particles per "barrel" of cement is desirable for most applications. Although the barrel is the common unit of measurement for cement within the oil and gas industry, the cubic yard is the more common measurement for most other applications. A barrel as used in this context is 42 gallons, or about 5.61 cubic feet of cement. Since one cubic yard is equal to 27 cubic feet, there are approximately 4.81 barrels in one cubic yard of cement. The above range thus equates to about 24 to 192 pounds of particles per cubic yard of cement in the finished slurry.

As used herein, "comprising" is synonymous with "including," "containing," or "characterized by," and is inclusive or open-ended and does not exclude additional, unrecited elements or method steps. As used herein, "consisting of" excludes any element, step, or ingredients not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

When a Markush group or other grouping is used herein, all individual members of the group and all combinations and subcombinations possible of the group are intended to be individually included in the disclosure. When a range is stated herein, the disclosure is intended to include all subranges within that range, and all discrete points within that range.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Thus, additional embodiments are within the scope of the invention and within the following claims.

In general the terms and phrases used herein have their art-recognized meaning, which can be found by reference to standard texts, journal references and contexts known to those skilled in the art. The preceding definitions are provided to clarify their specific use in the context of the invention.

All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention as set forth in the appended claims.

The invention claimed is:

1. An additive for mixing with cement from a cement source to form a slurry, the additive comprising a plurality of crumbled pellet particles of a plurality of grades, the crumbled pellet particles consisting essentially of wood fiber and moisture excluding an additional binder material, wherein each of said crumbled pellet particles comprises a particle diameter, further wherein said plurality of grades comprises a coarse particle grade and a medium particle grade, wherein said particle diameter of said crumbled pellet particles of said coarse particle grade is larger than 0.0394 inches, further wherein said particle diameter of said crumbled pellet particles of said medium particle grade is between 0.0098 inches and 0.0394 inches, wherein the crumbled pellet particles have a specific gravity greater than 1.0 but less than that of the cement, and further wherein the crumbled pellet particles function to remain substantially integral when mixed with the cement.

2. The additive of claim 1, wherein said wood fiber consists essentially of hardwood wood fiber.

3. The additive of claim 2, wherein said wood fiber consists essentially of oak wood fiber.

4. The additive of claim 1, wherein the specific gravity of the crumbled pellet particles is in the range of 1.1 to 1.3.

5. The additive of claim 1, wherein the moisture comprises 4 to 8% of the crumbled pellet particles by weight.

6. A method for manufacturing an additive for introduction into cement to form a slurry, said additive consisting essentially of wood and water, said method comprising the steps of:
   a. drying a wood source material to a desired moisture content;
   b. pelletizing the source material to produce a plurality of pellets, wherein the specific gravity of the plurality of pellets is greater than 1.0;
   c. crumbling the pellets into smaller crumbled pellet particles, wherein said crumbled pellet particles comprise a particle diameter;
   d. screening the crumbled pellet particles through a plurality of mesh screens to produce a plurality of crumbled pellet particle size grades, wherein said plurality of mesh screens comprise an 18 mesh size screen, and a 60 mesh size screen, further wherein said crumbled pellet particle size grades comprise a coarse particle grade, a medium particle grade, and a fine particle grade, wherein said particle diameter of said crumbled pellet particles of said coarse particle grade is greater than 0.0394 inches, further wherein said particle diameter of said crumbled pellet particles of said medium particle grade is between 0.0098 inches and 0.0394 inches, further wherein said particle diameter of said crumbled pellet particles of said fine particle grade is between 0.0029 inches and 0.0098 inches, to produce a plurality of crumbled pellet particle size grades, further wherein said crumbled pellet particles of said coarse particle grade are captured by said 18 mesh size screen, further wherein said crumbled pellet particles of said medium particle grade pass through said 18 mesh size screen and are captured by said 60 mesh size screen, further wherein said crumbled pellet particles of said fine particle grade pass through said 18 mesh size screen and said 60 mesh size screen and are captured by a 200 mesh size screen; and
   e. mixing the crumbled pellet particles of said coarse size grade and the crumbled pellet particles of said medium size grade to produce a mixture of crumbled pellet particle grades.

7. The method of claim 6, wherein said drying step comprises the step of drying the source material to 10% to 14% moisture content by weight.

8. The method of claim 7, further comprising the step of grinding the source material to a uniform size prior to the pelletizing step.

9. The method of claim 8, wherein the pellets produced in the pelletizing step comprise a bulk density in the range of 22 pounds per cubic foot to 34 pounds per cubic foot.

10. The method of claim 9, wherein the screening step further comprises the step of returning any oversized crumbled pellet particles to the crumbling step.

11. The method of claim 10, wherein a specific gravity of the mixture of crumbled pellet particle grades is less than a specific gravity of the cement.

12. A lightweight cement slurry, comprising cement and a plurality of crumbled pellet particles of a plurality of grades, the crumbled pellet particles consisting essentially of wood fiber and moisture excluding an additional binder material, wherein each of said crumbled pellet particles comprises a particle diameter, further wherein said plurality of grades comprises a coarse particle grade and a medium particle grade, wherein said particle diameter of said crumbled pellet particles of said coarse particle grade is larger than 0.0394 inches, further wherein said particle diameter of said crumbled pellet particles of said medium particle grade is between 0.0098 inches and 0.0394 inches, wherein the crumbled pellet particles have a specific gravity greater than 1.0 but less than that of the cement, and further wherein the crumbled pellet particles remain substantially integral when mixed with the cement.

13. The lightweight cement slurry of claim 12, wherein said wood fiber consists essentially of hardwood wood fiber.

14. The lightweight cement slurry of claim 13, wherein said wood fiber consists essentially of oak wood fiber.

15. The lightweight cement slurry of claim 12, wherein the specific gravity of the crumbled pellet particles is in the range of 1.1 to 1.3.

16. The lightweight cement slurry of claim 12, wherein the moisture comprises 4 to 8% of the crumbled pellet particles by weight.

17. The lightweight cement slurry of claim 12, wherein the slurry comprises 24 to 192 pounds of crumbled pellet particles per cubic yard of cement.

18. A lightweight cement slurry, comprising cement and a plurality of crumbled pellet particles of a plurality of grades, the crumbled pellet particles consisting essentially of wood fiber and moisture excluding an additional binder material, wherein the crumbled pellet particles have a specific gravity greater than 1.0 but less than that of the cement, and further wherein the crumbled pellet particles remain substantially integral when mixed with the cement.

19. The lightweight cement slurry of claim 18, wherein the specific gravity of the crumbled pellet particles is in the range of 1.1 to 1.3.

* * * * *